(12) United States Patent
Ishidate

(10) Patent No.: US 8,619,108 B2
(45) Date of Patent: Dec. 31, 2013

(54) OPTICAL SCANNING APPARATUS AND IMAGE FORMING APPARATUS

(75) Inventor: Takehiro Ishidate, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 12/916,402

(22) Filed: Oct. 29, 2010

(65) Prior Publication Data
US 2011/0128342 A1 Jun. 2, 2011

(30) Foreign Application Priority Data
Nov. 30, 2009 (JP) ................................. 2009-272572

(51) Int. Cl.
  *B41J 15/14* (2006.01)
  *B41J 27/00* (2006.01)

(52) U.S. Cl.
  USPC .......................................... 347/242; 347/257

(58) Field of Classification Search
  USPC .................. 347/231, 241–245, 256–261, 263
  See application file for complete search history.

(56) References Cited

U.S. PATENT DOCUMENTS

| 7,193,760 B2 * | 3/2007 | Kuribayashi ............... 359/198.1 |
| 2005/0046733 A1 * | 3/2005 | Bang ............................. 348/335 |
| 2006/0050344 A1 | 3/2006 | Kuribayashi |

FOREIGN PATENT DOCUMENTS

| JP | 60-004107 Y | | 2/1985 | |
| JP | 08017135 A | * | 1/1996 | ............. G11B 19/20 |
| JP | 2002-062500 A | | 2/2002 | |
| JP | 2005-201941 A | | 7/2005 | |
| JP | 2005201941 A | * | 7/2005 | ............. G02B 26/10 |
| JP | 2006-079052 A | | 3/2006 | |

* cited by examiner

*Primary Examiner* — Hai C Pham
(74) *Attorney, Agent, or Firm* — Canon U.S.A., Inc., IP Division

(57) ABSTRACT

An optical scanning apparatus includes a polygonal mirror configured to deflect a light beam emitted from a light source such that the laser beam scans a member to be scanned, a drive motor configured to rotate the polygonal mirror, aboard on which the polygonal mirror and the drive motor are mounted, an installation portion where the board is installed, a rubber member provided between the board and the installation portion, and an adjustment unit configured to position on the board with respect to the installation portion and to adjust inclination of the board with respect to the installation portion by deforming the rubber member.

4 Claims, 8 Drawing Sheets

OPTICAL SCANNING APPARATUS AND IMAGE FORMING APPARATUS

BACKGROUND OF THE INVENTION

1. Field of the Invention

The present invention relates to an electrophotographic image forming apparatus and an optical scanning apparatus which is mounted in the electrophotographic image forming apparatus, such as a digital copying machine, a laser beam printer, or a facsimile apparatus, and which is adapted to perform scanning with a laser beam.

2. Description of the Related Art

Conventionally, an electrophotographic image forming apparatus contains an optical scanning apparatus having a polygonal mirror to deflect a light beam emitted from a semiconductor laser constituting a light source such that the light beam scans a photosensitive drum as a photosensitive member. In an electrophotographic image forming apparatus, a light beam corresponding to image information is emitted from an optical scanning apparatus and applied to a photosensitive drum whose surface is charged, and scanning is performed on the photosensitive drum with the light beam, to form an electrostatic latent image on the photosensitive drum. The electrostatic latent image formed on the photosensitive drum is developed with a developer. The developed image is transferred and fixed to a recording medium such as a paper sheet.

In such an optical scanning apparatus, a rotation shaft for rotating the polygonal mirror may be inclined with respect to a desired installation angle for the rotation shaft (Hereinafter, this inclination will be referred to as shaft inclination). The shaft inclination is an inclination caused by limitations in production precision. If the polygonal mirror has shaft inclination, the incident position and incident angle on a scanning lens may uniformly deviate from the design values, which lead to a deterioration in image formation performance, such as disturbance of the light beam spot shape on the photosensitive drum, thus resulting in degradation in image quality.

FIGS. 8A and 8B illustrate an example of a conventional configuration of an optical scanning apparatus. FIG. 8A is a side view of a polygonal mirror and its periphery, and FIG. 8B is a perspective view of the polygonal mirror and its periphery.

In the optical scanning apparatus illustrated in FIG. 8A, a drive motor 803 for driving a polygonal mirror 804 has a bearing 802. The bearing 802 is fit-engaged with a hole provided in a board 801 (hereinafter referred to as the drive board) on which a drive circuit for driving the drive motor 803 is mounted, whereby the drive motor 803 is mounted on the drive board 801. Further, the bearing 802 is fit-engaged with a positioning hole 808 provided in an optical box 807 of the optical scanning apparatus, whereby positioning is effected on the drive motor 803 with respect to the optical box 807. The bearing 802 bears the shaft of the rotor portion of the drive motor 803, and a polygonal mirror 805 is mounted on the rotation shaft 804 of the rotor portion. The polygonal mirror 805 is fixed to the rotor portion from above by a plate spring or the like.

The drive board 801 is fixed to the optical box 807 by passing screws through screw holes provided in bosses 809, 810, 811, and 812 and through optical-box-side fixation holes 813, 814, 815, and 816 and by tightening the screws.

Since the bearing 802 is mounted on the drive board 801 by swaging or the like, there may be variations in the angle of the rotation shaft 804 with respect to the drive board 801 due to the production precision of the members and the precision of the swaging. Further, when the drive board 801 is formed of sheet metal, there is possibility of the drive board 801 being warped. Then, the rotation shaft 804 on which the polygonal mirror 805 is mounted is tilted accordingly (shaft inclination), and the reflection surface of the polygonal mirror 805 is also inclined, and so the reflection angle in the sub-scanning direction of the reflection light may deviate from the ideal position, thus resulting in deterioration in optical characteristics.

Further, it is also difficult for the mounting bearing surface of the optical box 807 to be machined into a flat surface in a strict sense, and this deviation from the ideal flat surface also leads to shaft inclination of the polygonal mirror.

To address these problems, Japanese Patent Application Laid-Open No. 2005-201941 discusses an apparatus capable of correcting shaft inclination. The apparatus discussed in Japanese Patent Application Laid-Open No. 2005-201941 is equipped with a mechanism pressing a drive board against a bearing surface formed on an optical box via a spring to vary a screw tightening amount, thereby reducing shaft inclination.

However, in a case where the drive board is fixed to the optical scanning apparatus via a sprig as in Japanese Patent Application Laid-Open No. 2005-201941, if the reaction force of the spring is weak, the polygonal mirror cannot be firmly fixed in position with respect to the optical scanning apparatus main body due to rotational vibration generated at the time of rotation of the polygonal mirror. When the polygonal mirror is not firmly fixed in position, the polygonal mirror vibrates due to the vibration generated at the time of rotation of the polygonal mirror, and, due to the influence of the vibration, there is a fear of the image forming position of the laser beam on the photosensitive drum deviating from the ideal position.

Thus, if the polygonal mirror is to be fixed to the optical box with a force strong enough to withstand the rotational vibration, there arises of necessity a need to secure a large spring deformation amount. Thus, to generate a large force, the size of the spring must be increased, which is an obstruction to a reduction in size of the optical scanning apparatus.

SUMMARY OF THE INVENTION

The present invention is directed to, among other things, a drive motor shaft inclination adjusting mechanism which is small and capable of reliable adjustment.

According to an aspect of the present invention, an optical scanning apparatus includes a polygonal mirror configured to deflect a light beam emitted from a light source such that the light beam scans a member to be scanned, a drive motor configured to rotate the polygonal mirror, a board on which the polygonal mirror and the drive motor are mounted, an installation portion where the board is installed, a rubber member provided between the board and the installation portion, and an adjustment unit configured to position the board with respect to the installation portion and to adjust inclination of the board with respect to the installation portion by deforming the rubber member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
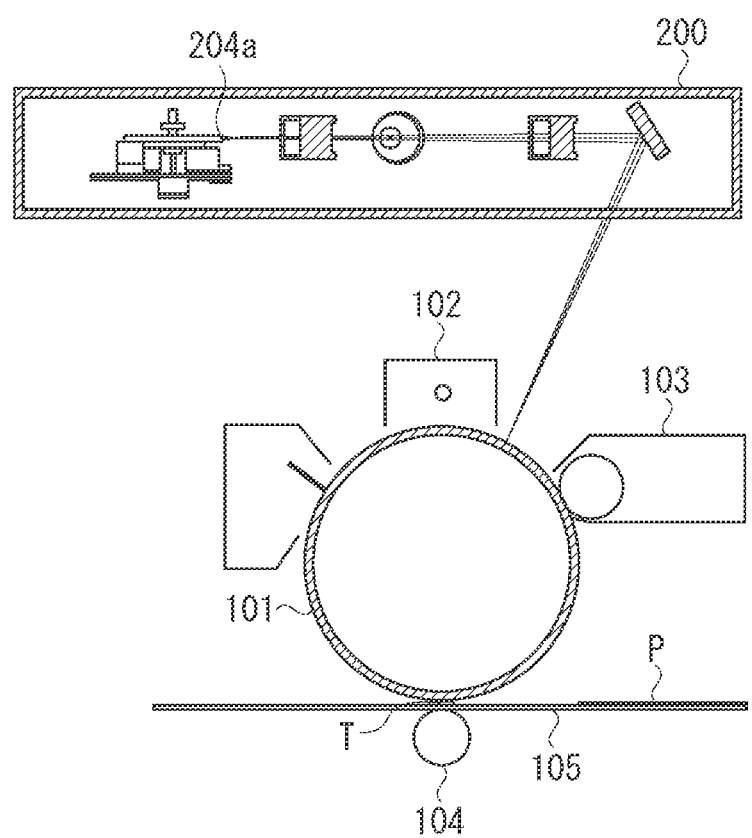
FIG. 1 is a schematic sectional view of a photosensitive drum and its periphery in an optical scanning apparatus according to an exemplary embodiment of the present invention.

FIG. 1 is a schematic sectional view of a photosensitive drum and its periphery in an electrophotographic copying machine employing an optical scanning apparatus according to a first exemplary embodiment of the present invention. An image forming process will be described with reference to FIG. 1. A laser beam (light beam) emitted from a light source (not shown) deflects by a polygonal mirror 204a (rotating polygonal mirror), and is guided to a photosensitive drum 101 (photosensitive member as a member to be scanned by the laser beam) via various optical systems including a lens described below, a reflection mirror, etc. The photosensitive drum 101 is uniformly charged by a charging device 102, and is then exposed to the laser beam emitted from a semiconductor laser (described below) of a light source unit in an optical scanning apparatus 200 based on input image data. The photosensitive drum 101 rotates at a fixed speed, and the photosensitive surface of the photosensitive drum 101 moves in a sub-scanning direction (the rotating direction of the photosensitive drum) with respect to the light beam. In this way, an electrostatic latent image based on the image data is formed on the photosensitive drum 101. This electrostatic latent image is developed by toner, which is a developer retained by a developing device 103. After this, a bias is applied to a transfer roller 104 constituting a transfer device, whereby the toner image borne by the photosensitive drum 101 is transferred to a transfer material P (a recording medium), conveyed on a conveyance path 105, at a transfer portion T formed by the transfer roller 104 and the photosensitive drum 101. Then, the transfer material P bearing the toner image is conveyed to a fixing device (not shown), and a fixing processing is performed on the toner image on the transfer material P through heating, etc., to obtain a transfer material with the image formed thereon.

Figure 2:
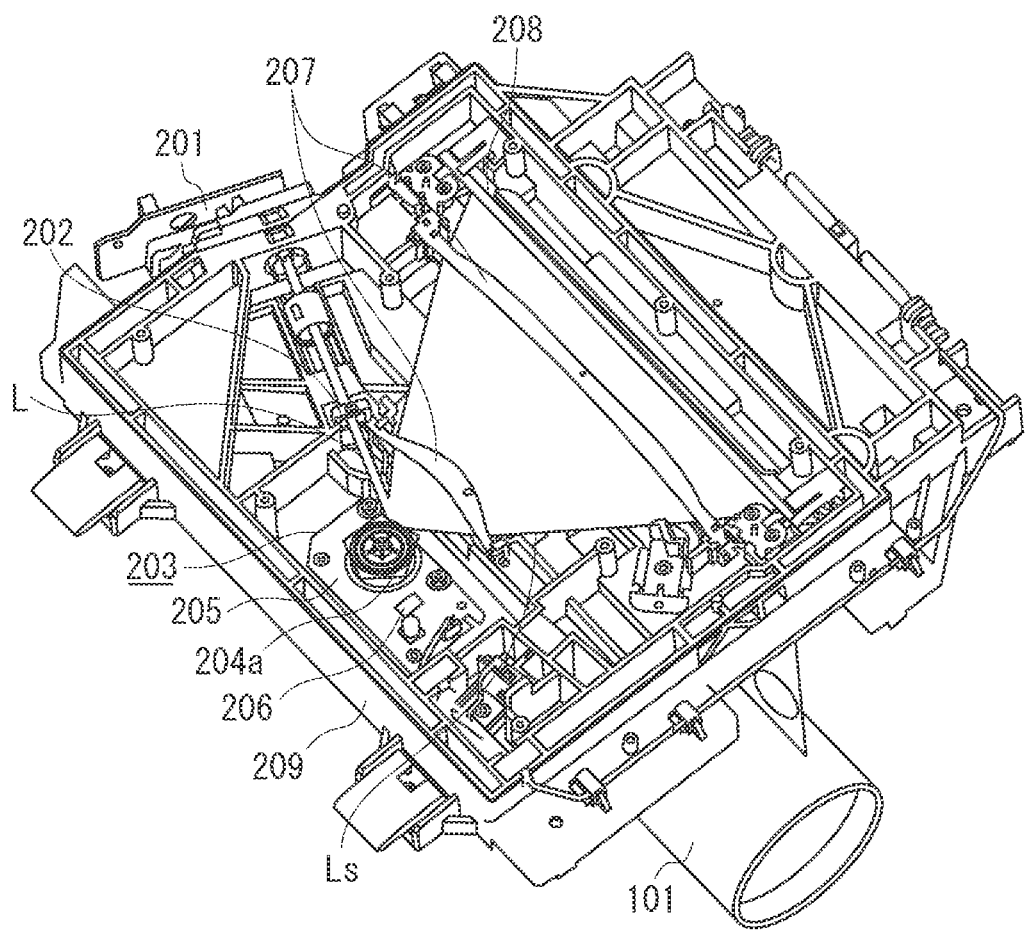
FIG. 2 is a perspective view of the interior of an optical scanning apparatus according to an exemplary embodiment of the present invention.

FIG. 2 is a perspective view of an example of the optical scanning apparatus 200 used in a laser printer, a digital copying machine or the like forming an image by the above-described image forming process. As illustrated in FIG. 2, the optical scanning apparatus 200 includes a light source unit 201 formed by integrating a semiconductor laser, a collimator lens, etc. into a unit, a cylinder lens 202 converting a laser beam in the form of a parallel beam generated therefrom into convergent light in a sub-scanning direction, and a scanning unit 203 for deflecting the laser beam emitted from the light source unit 201 such that the laser beam scans the photosensitive drum 101. The scanning unit 203 has a polygonal mirror 204a having a plurality of reflection surfaces for deflecting the laser beam, a drive motor (not shown) for the polygonal mirror 204a, a board 205, and an integrated circuit (IC) chip 206. The optical scanning apparatus 200 has a lens 207 effecting image formation on the surface of the photosensitive drum 101 with the laser beam that has been deflected by the polygonal mirror 204a, and a reflection mirror 208 guiding the laser beam to the photosensitive drum 101. The components of the optical scanning apparatus 200 are accommodated in an optical box 209.

The laser beam based on input image data is emitted from the light source unit 201. This laser beam passes through the collimator lens and the cylinder lens 202, and then impinges upon one of the plurality of reflection surfaces which the polygonal mirror 204a being rotated has. Since the polygonal mirror 204a is rotating, the laser beam is turned into scanning light after the reflection. After this, image formation is effected on the photosensitive drum 101 by the lens 207. In FIG. 2, symbol L indicates the laser beam emitted from the light source unit 201. In FIG. 2, symbol Ls indicates the path of the laser beam L undergoing scanning by the polygonal mirror 204a. In this way, an electrostatic latent image is formed in the rotation axis direction (main scanning direction) of the photosensitive drum 101 through the scanning by the polygonal mirror 204a, and an electrostatic latent image is formed in sub-scanning direction through the rotation of the photosensitive drum 101.

In an image forming apparatus equipped with the optical scanning apparatus 200, to reproduce a high definition image, it is beneficial to guide the laser beam onto the photosensitive drum 101 while minimizing deviation of the optical path so that the laser beam from the light source unit 201 follows the desired optical path at the time of designing. For this purpose, utmost caution is used in terms of the positions and attitudes of the optical components when they are mounted.

Above all, the orientation of the rotation shaft of the polygonal mirror 204a influences the scanning line curving on the photosensitive drum 101 and the beam spot diameter, so that, to maintain high image quality, it is necessary to adjust the inclination of the rotation shaft of the polygonal mirror 204a. For example, in the state in which the polygonal mirror 204a is installed in the optical box 209, when the rotation shaft is inclined with respect to the predetermined angle at the time of designing (hereinafter, this will be referred to as shaft inclination), the rotation shaft of the polygonal mirror 204a does not allow the incident light to impinge upon a reflection surface thereof at a predetermined angle. Then, the optical path of the laser beam after the reflection may deviate from the predetermined optical path, so that the optical path after the reflection deviates from the portion where the optical performance of the lens 207 is high (i.e., from the portion where the performance as expected at the time of designing is exerted). As a result, the spot of the laser beam effecting image formation on the photosensitive drum 101 is not of a desired size and shape. In view of this, it is necessary to adjust the orientation of the rotation shaft of the polygonal mirror 204a such that no shaft inclination occurs when installing the polygonal mirror 204a (hereinafter, this adjustment will be referred to as shaft inclination adjustment).

In the optical scanning apparatus according to the present exemplary embodiment, it is possible to perform shaft inclination adjustment with a simple construction without involving an increase in apparatus size. In the following, the construction of the optical scanning apparatus will be described in detail.

Figure 3A:
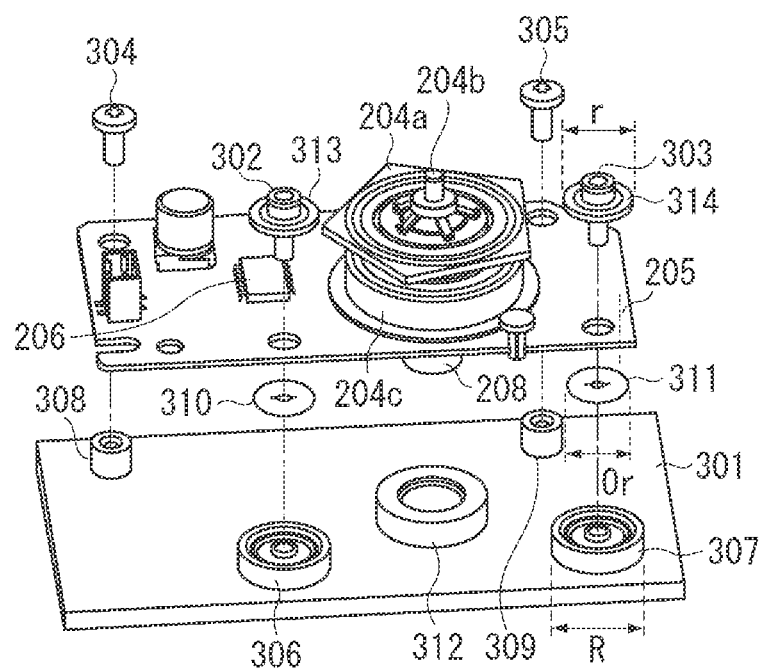
FIGS. 3A and 3B are a perspective view and a plan view, respectively, illustrating a scanning unit and its periphery in an optical scanning apparatus according to an exemplary embodiment of the present invention.

FIG. 3A illustrates how the scanning unit 203 is installed in the optical scanning apparatus 200 according to the present exemplary embodiment. The drive board 205 of the scanning unit 203 is provided with a plurality of holes for passing screws for fixing the drive board 205 to an installation portion 301 of the optical box 209. Adjustment screws 302 and 303 and fixation screws 304 and 305 are passed through these holes. Bearing surfaces 306, 307, 308, and 309 are provided so as to protrude from the installation portion 301 of the optical box 209. Female screws are formed in the interiors of the bearing surfaces. By fastening the adjustment screws 302 and 303 and the fixation screws 304 and 305 to the female screws, the drive board 205 is fixed to the installation portion 301. A bearing 208 for a rotation shaft 204b of the polygonal mirror 204a is fit-engaged with a fit-engagement hole provided in the drive board 205 by swaging. Through the fit-engagement of the bearing 208 with the fit-engagement hole, the polygonal mirror 204a and the drive motor 204c are fixed to the drive board 205. The bearing 208 also serves as the positioning boss of the scanning unit 203, and is fit-engaged with a positioning hole 312 provided in the optical box 209, whereby positioning is effected on the scanning unit 203 within the optical box 209.

As illustrated in FIG. 3A, when fixing the drive board 205 to the installation portion 301 of the optical box 209, the adjustment screw 302 and the adjustment screw 303 are passed through the holes provided in the drive board 205. Further, O-rings 310 and 311 are provided between the drive board 205 and the installation portion 301. The installation portion 301 is provided with the bearing surfaces 306 and 307. The bearing member is provided with a counterbore (recessed portions, spot facing) for accommodating the O-rings 310 and 311. The adjustment screws 302 and 303 are passed through the holes of the O-rings 310 and 311. The height of the O-rings is larger than the depth of the counterbore. Thus, by tightening the adjustment screws 302 and 303, the O-rings 310 and 311 are pressurized by the drive board 205 and the installation portion 301. As a result, a vertical reaction force is generated in the O-rings 310 and 311, and the drive board 205 is fixed to the installation portion 301 by the reaction force. Further, by adjusting the respective tightening amounts of the adjustment screws 302 and 303, it is possible to vary the respective compression amounts (amounts of deformation) of the O-rings 310 and 311, so that it is possible to arbitrarily vary the inclination (height) of the drive board 205 with respect to the installation portion 301. When the inclination of the drive board 205 is changed, the inclination of the rotation shaft 204b fit-engaged with (fixed to) the drive board 205 is also changed. Thus, by adjusting the tightening amounts of the adjustment screws 302 and 303, it is possible to adjust the shaft inclination. The O-rings 310 and 311 are configured such that the inner diameters thereof conform to the nominal diameters (outer diameters) of the adjustment screws 302 and 303.

As illustrated in FIG. 3A, the adjustment screws 302 and 303 are respectively provided with plain washers 314 and 315 for preventing warpage of the drive board 205 due to the deformation of the O-rings 310 and 311. The outer diameter r of the plain washers 313 and 314 illustrated in FIG. 3A is smaller than the inner diameter R of the bearing surfaces 306 and 307 (the diameter of the counterbore) but larger than the diameter Or of the O-rings 310 and 311.

By crushing the O-rings 310 and 311, it is possible to adjust the height of the drive board 205 with respect to the installation portion 301. At the time of adjustment, when the adjustment screws 302 and 303 are tightened, an appropriate reaction force is required within a range not causing abnormal deformation of the O-rings 310 and 311. It is necessary for this nature not to undergo changes with passage of time. As a material having such a nature, a rubber member composed of synthetic rubber is excellent. Typical examples of such a material include materials capable of elastic deformation, such as nitrile rubber, hydrogenated nitrile rubber, ethylene propylene rubber, silicone rubber, fluoro rubber, and acrylic rubber.

Figure 3B:
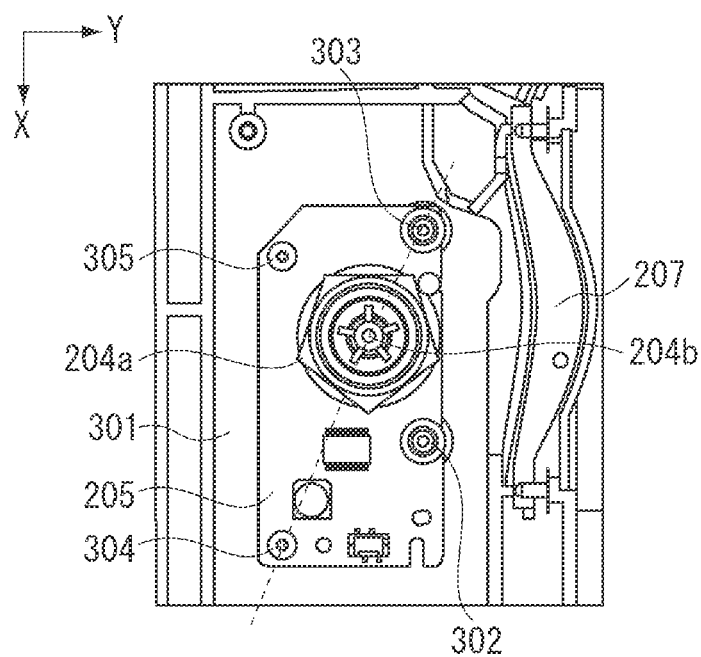

FIG. 3B is a plan view, as seen from the direction of the rotation shaft 204b of the polygonal mirror 204a, of the drive board 205 installed on the installation portion 301. In the optical scanning apparatus 200 according to the present exemplary embodiment, the laser beam L impinges upon the polygonal mirror 204a from the direction illustrated in FIG. 3B to be turned into scanning light Ls. Further, as illustrated in FIG. 3B, the adjustment screws 302 and 303 are arranged with respect to the position of the rotation shaft 204b such that a line segment connecting the position of the adjustment screw 302 and the position of the rotation shaft of the polygonal mirror and a line segment connecting the position of the adjustment screw 303 and the position of the rotation shaft of the polygonal mirror are substantially orthogonal to each other.

Figure 4:
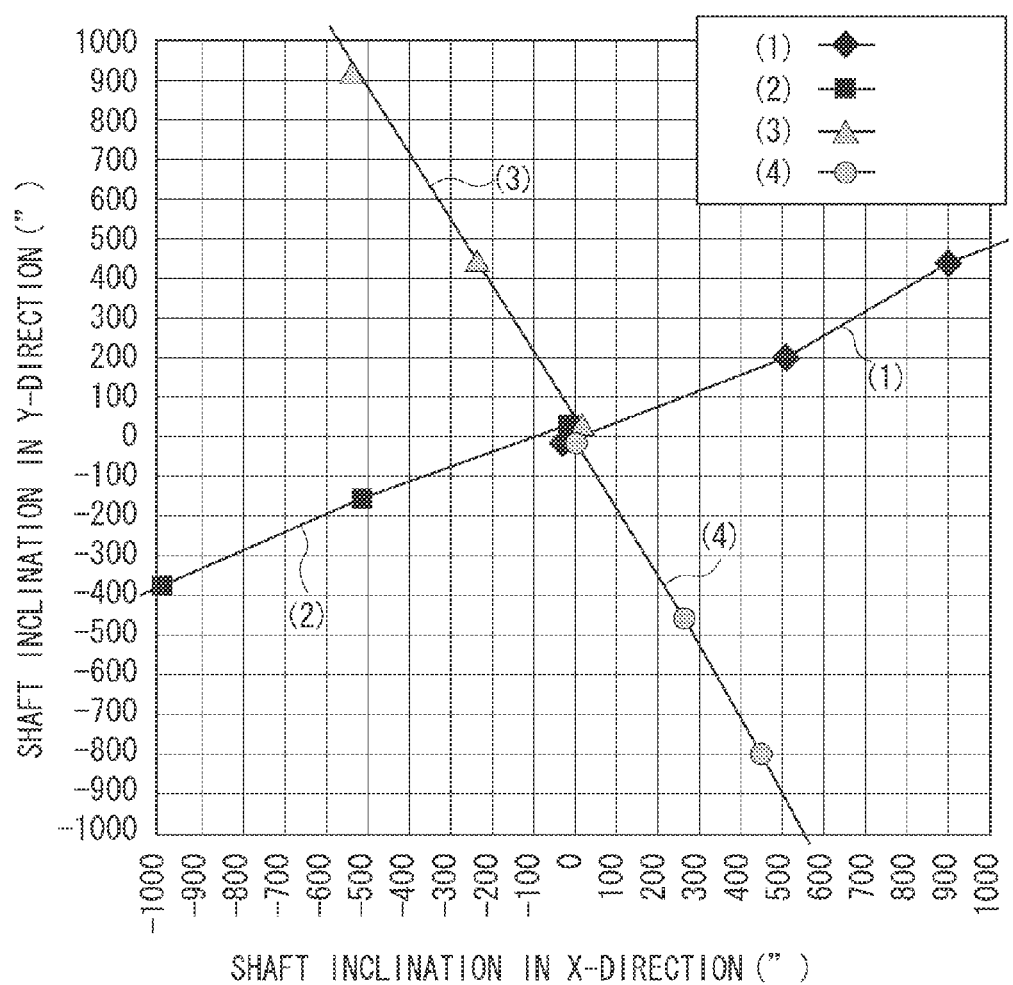
FIG. 4 illustrates a fluctuation amount of a rotation shaft at the time of shaft inclination adjustment in an exemplary embodiment of the present invention.

FIG. 4 illustrates how the shaft inclination value (the angular deviation of the rotation shaft 204b with respect to an axis perpendicular to a reference plane of the optical box 209) is changed when shaft inclination of the rotation shaft 204b is adjusted by actually tightening the adjustment screws 302 and 303 provided at two positions. The horizontal axis indicates the shaft inclination in the X-direction in FIG. 3B, and the vertical axis indicates the shaft inclination in the Y-direction, with an angle perpendicular to the reference plane of the optical box 209 serving as an origin. In FIG. 4, line (1) shows how the shaft inclination changes when the adjustment screw 302 is tightened while fixing the adjustment screw 303 in position. Line (2) shows how the shaft inclination changes when the adjustment screw 302 is loosened while fixing the adjustment screw 303 in position. Line (3) shows how the shaft inclination changes when the adjustment screw 303 is tightened while fixing the adjustment screw 302 in position. Line (4) shows how the shaft inclination changes when the adjustment screw 303 is loosened while fixing the adjustment screw 302 in position. The plots in FIG. 4 indicate how the shaft inclination value changes when the adjustment screws 302 and 303 are turned by 90°. As illustrated in FIG. 4, the shaft inclination changes mainly in the Y-direction according to the tightening amount of the adjustment screw 303. With the adjustment screw 302, the shaft inclination changes mainly in the X-direction. As illustrated in FIG. 3B, the adjustment screw 302 and the adjustment screw 303 are arranged with respect to the position of the rotation shaft 204b such that the line segment connecting the adjustment screw 303, which is one adjustment screw, and the rotation shaft of the polygonal mirror, and the line segment connecting the adjustment screw 302, which is the other adjustment screw, and the rotation shaft of the polygonal mirror, are substantially orthogonal to each other. With this arrangement, it is possible to adjust the orientation of the rotation shaft 204b in an arbitrary direction by adjusting the tightening amounts of the adjustment screws 302 and 303. Thus, no matter what way the inclination at the time of initial assembly may be, the shaft inclination can be reliably adjusted from two directions by adjusting the tightening amounts of the adjustment screws 302 and 303. Assuming that the distance between the adjustment screw 302 and the rotation shaft 204b and the distance between the adjustment screw 303 and the rotation shaft 204b are substantially equal to each other, the rotation shaft 204b undergoes a fluctuation in the inclination by substantially the same change amount by tightening the adjustment screws by the same tightening amount, which is convenient for the operator or the adjustment apparatus, etc. In the present exemplary embodiment, by adjusting the height of the drive board 205 by ±0.2 mm, it is possible to cancel shaft inclination caused by accumulation of component tolerances.

Figure 5:
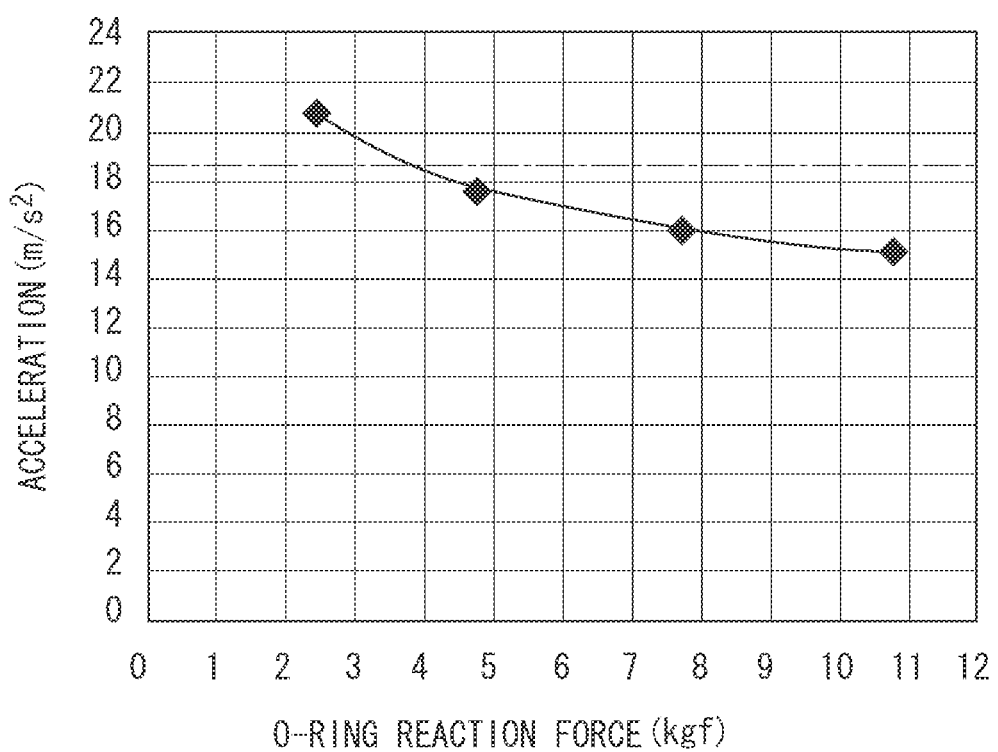
FIG. 5 illustrates the relationship between a reaction force of an O-ring and a vibration on a drive board.

The O-rings 310 and 311 are compressed according to the tightening amounts of the adjustment screws 302 and 303, and the drive board 205 is pressed against the adjustment screws 302 and 303 by the reaction force thereof. In the following, the proper magnitude of the reaction force will be described. While in the related-art technique the drive board is fastened to the installation surface of the optical box totally by screws, in the construction of the present exemplary embodiment, there exists, as illustrated in FIG. 3, an adjustment portion where the drive board is upwardly urged. Generally speaking, the high-speed rotation drive motor used in the scanning unit 203 generates a large vibration depending upon the balance thereof, so that it is desirable for the drive motor to be perfectly fixed to the member in which it is accommodated by screw fastening. This is all the more so if exposure is to be effected through scanning with a laser beam by using the polygonal mirror 204a. In the construction of the optical scanning apparatus according to the present exemplary embodiment illustrated in FIGS. 3A and 3B, the drive board is not perfectly fixed to the installation surface of the optical box, so that the effect of suppressing vibration is reduced. However, it is advantageous in that it allows adjustment of the shaft inclination of the scanning unit 203. As described above, at the above adjustment portions of the optical scanning apparatus according to the present exemplary embodiment, the drive board 205 is upwardly urged by the reaction force of the O-rings 310 and 311, and it is to be assumed that the magnitude of the reaction force of the O-rings 310 and 311 influences the magnitude of the vibration of the scanning unit 203. In this connection, the graph of FIG. 5 illustrates the relationship between the reaction force of the O-rings and the magnitude of the vibration. In the graph, the horizontal axis indicates the reaction force of the O-rings 310 and 311, and the vertical axis indicates the acceleration of the drive board 205, which is supposed to represent the vibration level of the scanning unit. In the graph, the long and short dash line indicates the vibration level when the drive board is fastened to the installation surface of the optical box completely by screws. In FIG. 5, the curve indicates the vibration level in the present exemplary embodiment. As can be seen from FIG. 5, in order for the vibration level of the drive board 205 in the present exemplary embodiment to be equal to or less than the vibration level in the case of screw fastening, it is necessary for the reaction force of the O-rings to be at least approximately 4 kgf to 5 kgf or more. Conversely, if a level where the reaction force is equal to or more than that is adopted, the vibration is not easily generated, and it is possible to adjust shaft inclination. Thus, when adopting the construction of the present exemplary embodiment, the nominal compression amount is to be set such that a reaction force of approximately 4 kgf to 5 kgf can be secured for the O-rings even in the case of the maximum loosening amount imaginable for the adjustment screws 302 and 303.

For example, when O-rings of a length of 2.6 mm and an inner diameter of 3.6 mm are adopted, it is possible to perform designing with an O-ring reaction force of 8 kgf when the nominal compression amount is 1 mm, and with an O-ring reaction force of 5 kgf to 11 kgf, even if a change in the compression amount of the O-rings due to the shaft inclination adjustment is allowed for.

In contrast, when, as discussed in Japanese Patent Application Laid-Open No. 2005-201941, designing is performed so as to obtain a reaction force of 8 kgf by using a compression spring as the elastic member, even if the spring constant is set high due to the reduction in the size of the compression spring, the height in the free state of the compression spring is 10 mm and the height thereof during operation is approximately 8 mm, which means the size involved is approximately four times that in the case of the construction employing O-rings. Further, since the height in the free state of the elastic member is large, when assembling the scanning unit to the optical box, it is rather difficult to effect positioning on the scanning unit, so that the assembly is rather difficult to perform.

Thus, the shaft inclination adjustment system using O-rings helps to achieve a reduction in size, and is superior to the elastic member composed of a compression spring, a plate spring or the like. The shaft inclination adjustment is performed as follows before factory shipment or at the time of maintenance by a service engineer. The assembly worker or the service engineer arranges a jig in the optical path of a light beam, and detects the light beam reflected by the polygonal mirror 204a by means of a charge-coupled device (CCD) provided in the jig. Then, looking at the position of the light beam incident on the CCD, the assembly worker or the service engineer determines the tightening amounts of the adjustment screws 302 and 303.

A second exemplary embodiment of the present invention will be described with reference to FIGS. 6A through 6E and FIG. 7. The second exemplary embodiment differs from the first exemplary embodiment in that the counterbore provided with the bearing surfaces 306 and 307 are provided with recessed portions for allowing deformation of the O-rings 310 and 311. More specifically, a recessed portion 601 as illustrated in FIGS. 6A, 6B, 6C, and 6D is provided in a part of the counterbore provided with each of the bearing surfaces 306 and 307. Otherwise, the second exemplary embodiment is of a construction the same as, or alternatively similar to, that of the first exemplary embodiment, so, in the following description, the portions that are the same as, or alternatively similar to, those of the first exemplary embodiment are indicated by the same reference numerals as in the first exemplary embodiment.

FIGS. 6A, 6B, 6C, and 6D are schematic sectional views of the adjustment screw 302, the O-ring 310, and the bearing surface 306. FIGS. 6A, 6B, 6C, and 6D illustrate how the O-ring undergoes deformation when the adjustment screw 302 is actually tightened to adjust shaft inclination. Here, what is characteristic is that the optical box 209 is provided with a clearance configuration 601 conforming to the deformation of the O-ring due to the compression thereof. On the other hand, FIG. 6E illustrates how the O-ring is compressed through tightening of the adjustment screw in a construction provided with no clearance configuration. The constructions of the adjustment screw 303, the O-ring 311, and the bearing surface 307 are similar to those of the adjustment screw 302, the O-ring 310, and the bearing surface 306.

By tightening the adjustment screw 302, the O-ring undergoes elastic deformation so as to be shrunk in the direction of the rotation axis 204b and undergoes elastic deformation so as to expand in the radial direction of the rotation shaft 204b (i.e., along the surface of the board). However, in the construction as illustrated in FIG. 6E, in which there is no escape for the deformed O-ring, the O-ring is stiffened, its pliability is reduced, so that the linearity of the reaction force is impaired. Then, the tightening torque of the adjustment screw 302 increases accordingly. If the adjustment screw is forcibly pushed in, due to the reduction in the elasticity of the O-ring, which has shrunk and stiffened, it is impossible to adjust the height of the drive board 205 in conformity with the tightening amount. As a result, the precision in the shaft inclination adjustment deteriorates. To prevent this, it might be possible to secure a large escape in the radial direction of the rotation shaft 204b. In that case, however, it would be necessary to simultaneously enlarge the plain washer 313 for preventing the drive board 205 from following the deformation of the O-ring, which means there would be a possibility of the plain washer interfering with a component on the drive board 205.

Figure 6A:
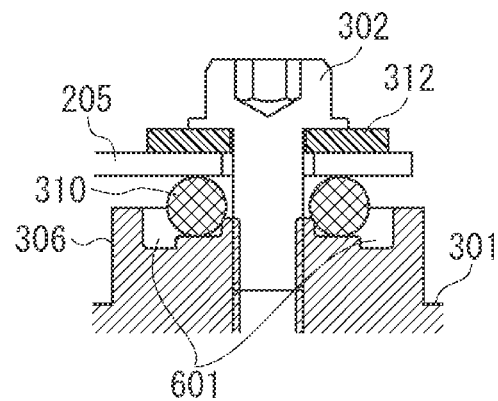
FIGS. 6A to 6E are diagrams illustrating clearance portions provided to deal with compressive deformation of an O-ring.
Figure 6B:
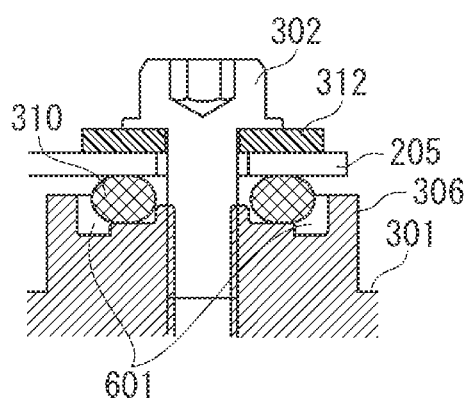
Figure 6C:
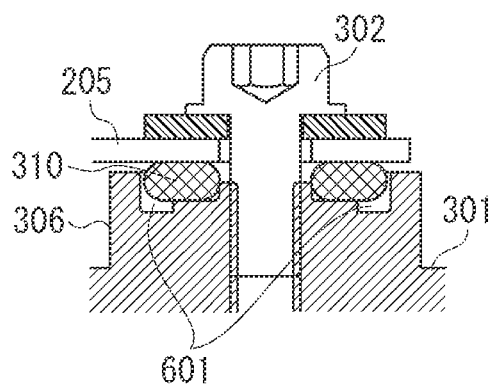
Figure 6D:
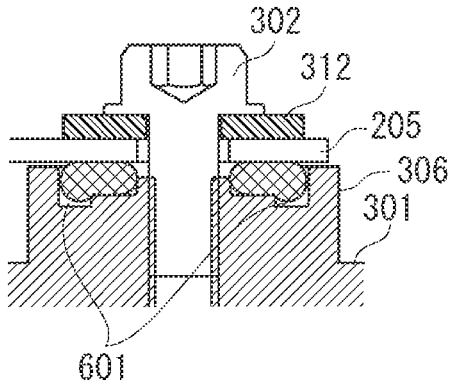
Figure 6E:
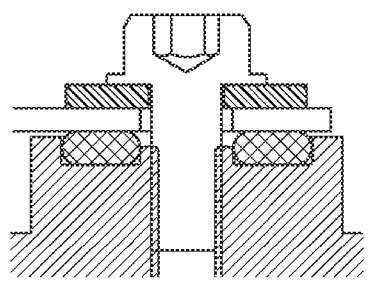

In view of this, there is provided in the bearing surface 306, 307 of the optical box a clearance configuration (recessed portion 601) for allowing deformation of the O-ring when the compression amount of the O-ring has increased to a certain degree as illustrated in FIGS. 6C and 6D, that is, when the O-ring has greatly expanded in the radial direction of the rotation shaft 204b. Due to the provision of the recessed portion 601, the linearity of the O-ring reaction force is maintained, and the height of the drive board 205 is adjusted in conformity with the tightening amount, and it is possible to perform the shaft inclination adjustment with high precision. By varying the configuration of the recessed portion 601, it is possible to design a profile of an optimum spring constant. In the present exemplary embodiment, an annular (circular) O-ring is used, so that the recessed portion 601 is provided so as to allow the O-ring, which is deformed radially around the rotation shaft 204b, to undergo downward deformation as illustrated in FIG. 6D.

Figure 7:
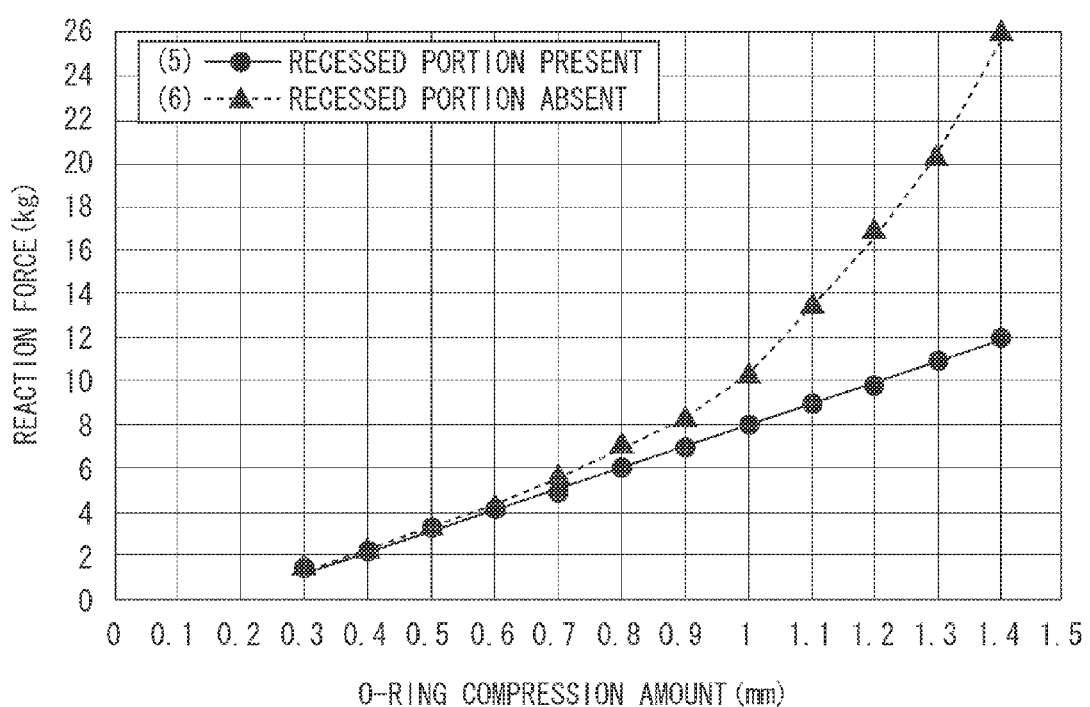
FIG. 7 illustrates the relationship between the compression amount of an O-ring and the reaction force thereof.
Figure 8A:
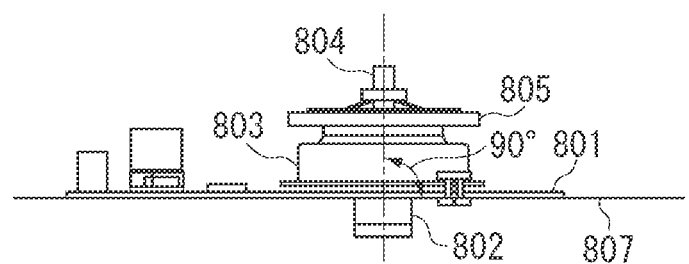
FIGS. 8A and 8B are a sectional view and a perspective view, respectively, of a scanning unit and its periphery in a conventional optical scanning apparatus.
Figure 8B:
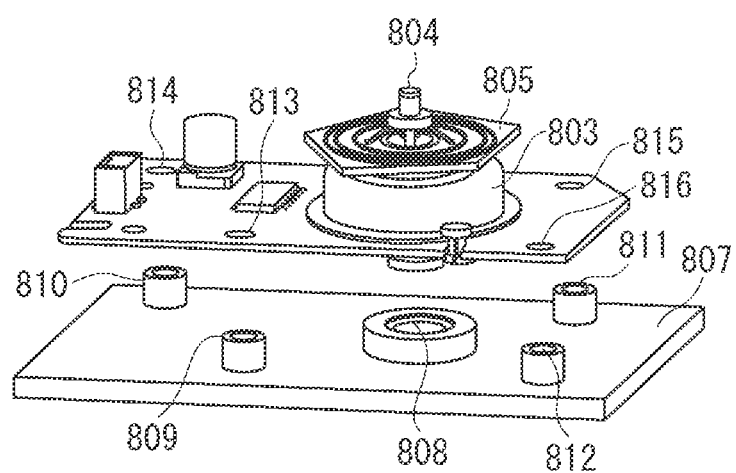

FIG. 7 is a graph illustrating, by way of example, the relationship between the compression amount of the O-ring and the compression amount thereof. As can be seen from the graph, in the case where a clearance configuration (recessed portion) is provided in the optical box, the relationship between the compression amount of the O-ring and the reaction force thereof is such as can be expressed in a neat linear line, which means resiliency is maintained. On the other hand, in a case where no recessed portion is provided as illustrated in FIG. 6E, a profile in the form of a quadratic curve results as indicated by line (6) in FIG. 7, with the linearity of the reaction force being impaired. Thus, it is more desirable to provide the optical box with a clearance configuration (recessed portion) allowing the deformed O-ring to escape.

In this way, by providing the recessed portion 601 in the bearing surface in which the O-ring is accommodated, it is possible to adjust shaft inclination easily and with high precision even if the compression amount of the O-ring is large.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-272572 filed Nov. 30, 2009, which is hereby incorporated by reference herein in its entirety.

What is claimed is:

1. An optical scanning apparatus comprising:
a polygonal mirror configured to deflect a light beam emitted from a light source such that the light beam scans a member to be scanned;
a drive motor configured to rotate the polygonal mirror;
a lens configured to guide the light beam deflected by the polygonal mirror to the member to be scanned;
a board on which the polygonal mirror and the drive motor are mounted;
a first installation portion and a second installation portion where the board is installed and a fixing portion where the board is fixed rigidly, wherein the first installation portion and the second installation portion are arranged on sides opposite to each other across a straight line connecting an optical axis of the lens and a rotation shaft of the polygonal mirror;
a first rubber member provided between the board and the first installation portion, wherein the first rubber member makes contact with the board and the first installation portion;
a second rubber member provided between the board and the second installation portion, wherein the second rubber member makes contact with the board and the second installation portion;
a first adjustment unit configured to position the board with respect to the first installation portion and to deform the first rubber member, wherein the first adjustment unit adjusts inclination of the board with respect to the first installation portion by deforming the first rubber member; and
a second adjustment unit configured to position the board with respect to the second installation portion and to deform the second rubber member, wherein the second adjustment unit adjusts inclination of the board with respect to the second installation portion by deforming the second rubber member;
wherein the first adjustment unit includes a first screw for fixing the board to the first installation portion and for deforming the first rubber member, and the second adjustment unit includes a second screw for fixing the board to the second installation portion and for deforming the second rubber member, wherein the first screw is fastened to a first female screw formed in the first installation portion and the second screw is fastened to a second female screw formed in the second installation portion, and wherein the first rubber member is provided between the board and the first installation portion so as to be in conformity with the outer diameter of the first screw and the second rubber member is provided between the board and the second installation portion so as to be in conformity with the outer diameter of the second screw; and
wherein the first installation portion is provided with a counterbore for accommodating the first rubber member, and wherein the counterbore is provided with a recessed portion for allowing the first rubber member to escape when the first rubber member is deformed by pressure from the board and the first installation portion; and
further comprising a plain washer provided between the first screw and the board, wherein an outer diameter of the plain washer is smaller than an inner diameter of the counterbore and larger than an outer diameter of the first rubber member.

2. The optical scanning apparatus according to claim 1, wherein the first adjustment unit and the second adjustment unit are arranged such that a line segment connecting the first adjustment unit and the rotation shaft of the polygonal mirror and a line segment connecting the second adjustment unit and the rotation shaft are orthogonal to each other.

3. The optical scanning apparatus according to claim 1, wherein the board is fixed to the fixing portion without a rubber member between the board and the fixing portion.

4. An image forming apparatus comprising:
the optical scanning apparatus according to claim 1;
a photosensitive member to be exposed to the light beam deflected by the polygonal mirror;
a developing unit configured to develop, with toner, an electrostatic latent image formed on the photosensitive member exposed to the light beam;
a transfer unit configured to transfer a toner image formed on the photosensitive member onto a recording medium.

* * * * *